(12) United States Patent
Kim

(10) Patent No.: US 11,745,575 B2
(45) Date of Patent: Sep. 5, 2023

(54) BATTERY MOUNTING STRUCTURE OF ELECTRIC VEHICLE

(71) Applicants: HYUNDAI MOTOR COMPANY, Seoul (KR); KIA CORPORATION, Seoul (KR)

(72) Inventor: Hyunsik Kim, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 181 days.

(21) Appl. No.: 17/244,635

(22) Filed: Apr. 29, 2021

(65) Prior Publication Data
US 2022/0194196 A1    Jun. 23, 2022

(30) Foreign Application Priority Data
Dec. 23, 2020 (KR) .................. 10-2020-0181664

(51) Int. Cl.
| | | |
|---|---|---|
| B60K 1/02 | (2006.01) | |
| B60K 1/04 | (2019.01) | |
| H01M 50/262 | (2021.01) | |
| H01M 50/204 | (2021.01) | |
| H01M 50/242 | (2021.01) | |
| B60R 16/04 | (2006.01) | |

(52) U.S. Cl.
CPC ............... B60K 1/04 (2013.01); B60R 16/04 (2013.01); H01M 50/204 (2021.01); H01M 50/242 (2021.01); H01M 50/262 (2021.01); *B60K 2001/0461* (2013.01)

(58) Field of Classification Search
CPC ............ H01M 50/204; H01M 50/242; H01M 50/262; B60K 1/04; B60K 1/02
See application file for complete search history.

(56) References Cited

U.S. PATENT DOCUMENTS

| | | | |
|---|---|---|---|
| 8,936,124 B2* | 1/2015 | Auer ...................... | B60L 50/64 180/68.5 |
| 10,399,425 B2* | 9/2019 | Okamura ................ | B60L 50/64 |

* cited by examiner

*Primary Examiner* — Jason D Shanske
*Assistant Examiner* — James J Triggs
(74) *Attorney, Agent, or Firm* — MCDONNELL BOEHNEN HULBERT & BERGHOFF LLP

(57) ABSTRACT

A battery mounting structure of an electric vehicle is provided. The battery mounting structure includes a battery case including a side case portion in which a recess portion concave inwardly is formed and a battery connection member mounted in a vehicle body and having an insert portion inserted into the recess portion and connected to the side case portion.

15 Claims, 8 Drawing Sheets

BATTERY MOUNTING STRUCTURE OF ELECTRIC VEHICLE

CROSS-REFERENCE TO RELATED APPLICATION

This application claims priority to and the benefit of Korean Patent Application No. 10-2020-0181664 filed on Dec. 23, 2020, the entire contents of which are incorporated herein by reference.

TECHNICAL FIELD

The present disclosure relates to a battery mounting structure of an electric vehicle.

BACKGROUND

Globally, research on electric vehicles (EVs) is accelerating in response to exhaust gas regulations and the demand for environment-friendly vehicles.

Electric vehicles use electrical energy required for driving by charging batteries.

The general electric vehicle high voltage battery case is sometimes made of aluminum extrusion type to protect the battery in case of a crash. However, in the case of aluminum extrusion type battery case, it is excellent in absorbing collision energy, but there is a possibility of battery damage and fire due to excessive deformation during collision.

On the contrary, in the case of a battery case made of steel, the amount of deformation during a collision may be relatively small, but there is a possibility of damage to the battery and fire due to not properly absorbing the collision energy.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a battery mounting structure of an electric vehicle capable of absorbing collision energy and protecting the battery in the event of a vehicle collision.

A battery mounting structure of an electric vehicle in some forms of the present disclosure may include a battery case including a side case portion in which a recess portion concave inwardly is formed and a battery connection member mounted in the vehicle body and having an insert portion inserted into the recess portion and connected to the side case portion.

The recess portion and the insert portion may be formed at an acute angle with respect to the insert direction of the battery connection member to the side case portion.

The recess portion and the insert portion may be in surface contact.

At least one chamber may be formed inside the battery connection member.

An insert portion chamber may be formed inside the insert portion.

The battery connection member may include a connection hole for connection with the vehicle body.

The battery mounting structure may further include a connection pipe inserted into the connection hole.

The recess portion and the insert portion may be bolted together.

The side case portion may include an outer panel of which the recess portion is formed thereon and an inner panel connected to the outer panel.

In the outer panel, an outer flange may be formed in the direction opposite to the direction of forming the recess portion and an inner flange coupled to the outer flange may be formed to the inner panel.

The recess portion may be in contact with the inner panel.

The recess portion and the inner panel and the insert portion may be bolted together.

The recess portion may be in contact with the inner panel, and the insert portion may be separated from the recess portion.

The recess portion and the inner panel may be bolted together.

The side case part and the battery connection member may be made of different materials.

The side case portion may be formed of steel material and the battery connection member may be formed of aluminum material.

According to the battery mounting structure of an electric vehicle in some forms of the present disclosure, the battery connection member of aluminum material is deformed during a vehicle collision, and the battery may be protected by absorbing collision energy.

According to the battery mounting structure of the electric vehicle in some forms of the present disclosure, the battery case made of steel material may protect the battery when a vehicle crashes, thereby reducing the occurrence of fire due to battery damage.

In addition, the effect obtained or predicted by some forms of the present disclosure will be disclosed directly or implicitly in the detailed description of the present disclosure. That is, various effects predicted in some forms of the present disclosure will be disclosed within a detailed description to be described later.

DRAWINGS

Since these drawings are for reference only to describe an exemplary embodiment of the present disclosure, the technical idea of the present disclosure should not be interpreted as being limited to the accompanying drawing.

<Description of symbols>

Figure 1:
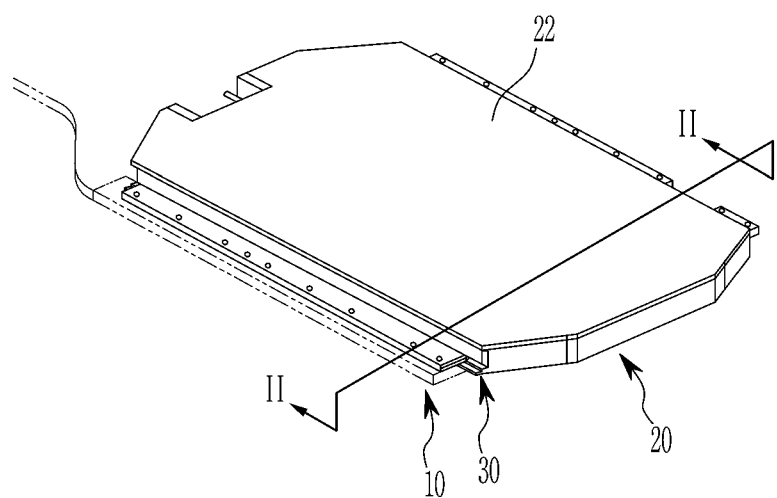
FIG. 1 is a perspective view of a battery case including a battery mounting structure of an electric vehicle in some forms of the present disclosure.

| | |
|---|---|
| 10: vehicle body | 20: battery case |
| 22: upper case portion | 24: lower case portion |
| 30: side case portion | 40: outer panel |
| 42: recess portion | 44: outer flange |
| 50: inner panel | 52: inner flange |
| 60: battery connection member | 62: insert portion |
| 64: insert portion chamber | 66: connection hole |
| 68: connection pipe | |

DETAILED DESCRIPTION

In the following detailed description, only certain exemplary embodiments of the present disclosure have been shown and described, simply by way of illustration.

As those skilled in the art would realize, the described embodiments may be modified in various different ways, all without departing from the spirit or scope of the present disclosure Parts marked with the same reference number throughout the specification mean the same constituent elements.

In the drawings, the thickness of layers, films, panels, regions, etc., are exaggerated for clarity.

When a part such as a layer, film, region, or plate is said to be "on" another part, this includes not only the case directly above the other part, but also the case where there is another part in between.

In contrast, when an element is referred to as being "directly on" another element, there are no intervening elements present.

Throughout the specification, when a part "includes" a certain component, it means that other components may be further included rather than excluding other components unless otherwise stated.

An exemplary embodiment of the present disclosure will hereinafter be described in detail with reference to the accompanying drawings.

Figure 2:
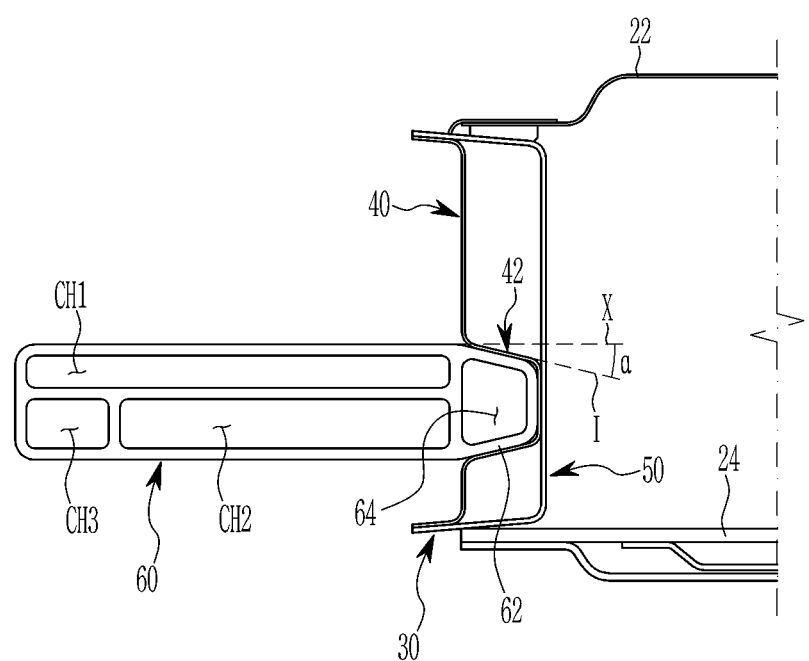
FIG. 2 is a cross-sectional view along the line II-II of FIG. 1.

FIG. 1 is a perspective view of a battery case including a battery mounting structure of an electric vehicle in some forms of the present disclosure and FIG. 2 is a cross-sectional view along the line II-II of FIG. 1.

Referring to FIG. 1 and FIG. 2, a battery case 20 with a built-in battery includes an upper case portion 22, a lower case portion 24, and a side case portion 30 connected to a vehicle body 10.

A battery connection member 60 is mounted between the vehicle body 10 and the side case portion 30.

The battery mounting structure of an electric vehicle in some forms of the present disclosure may include the battery case 30 in which a recess portion 42 concave inwardly is formed and the battery connection member 60 mounted in the vehicle body 10 and having an insert portion 62 inserted into the recess portion 42 and connected to the side case portion 30.

The side case portion 30 and the battery connection member 60 may be formed of different materials.

For example, the upper case portion 22, the lower case portion 24 and the side case portion 30 may be formed of a steel material, and the battery connection member 60 may be formed of an aluminum material.

The side case portion 30 may be made of, for example, a high-strength steel sheet of 100K or higher, and the battery connection member 60 may be formed by extrusion of aluminum. Therefore, when an external impact occurs, the battery connection member 60 is damaged first, and the impact is absorbed and the battery case 20 may be prevented from being damaged.

The recess portion 42 and the insert portion 62 may be formed at an acute angle (a) with respect to the insert direction of the battery connection member 60 with respect to the side case portion 30. And, the recess portion 42 and the insert portion 62 may be in surface contact. Since the recess portion 42 and the insert portion 62 are formed at an acute angle ($\alpha$) with respect to the insert direction of the battery connection member 60, so that the battery connection member 60 may be easily inserted into the recess portion 42, and the recess portion 42 and the insert portion 62 may be firmly bonded by making surface contact.

At least one chamber CH1, CH2, and CH3 may be formed inside the battery connection member 60. The drawing shows that three chambers CH1, CH2, and CH3 are formed, but is not limited thereto, and various number of chambers may be formed. By forming a chamber inside the battery connection member 60, the weight of the battery connection member 60 may be reduced.

An insert portion chamber 64 may be formed inside the insert portion 62. Fastening with the recess portion 42 through the insert portion chamber 64, for example, a bolting operation may be easier, and the insert portion 62 may be deformed when an external collision occurs, thereby absorbing an impact.

Figure 3:
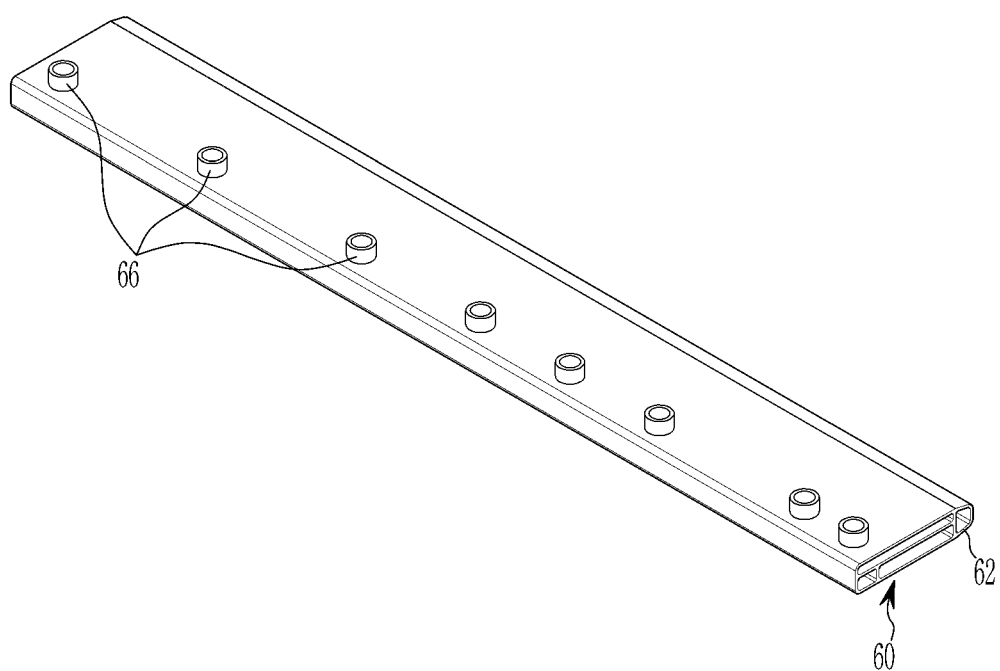
FIG. 3 is a perspective view of a battery connection member applicable to a battery mounting structure of an electric vehicle in some forms of the present disclosure.
Figure 4:
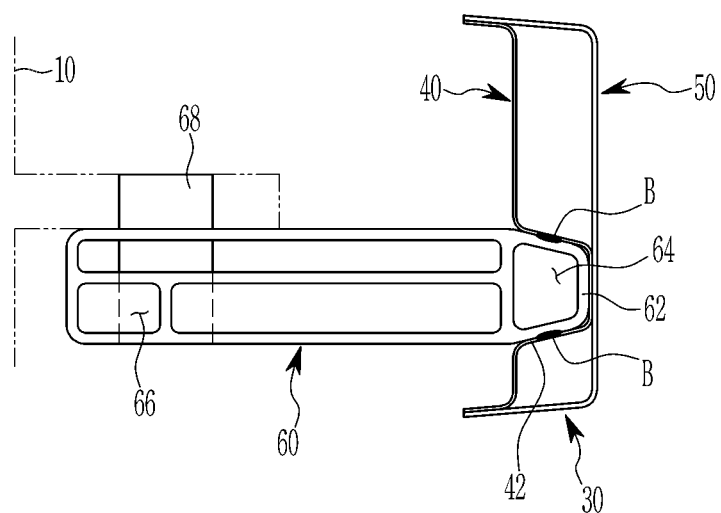
FIG. 4 is a cross-sectional view illustrating a connection of a battery connection member and a side case portion that may be applied to the battery mounting structure of an electric vehicle in some forms of the present disclosure.

FIG. 3 is a perspective view of a battery connection member applicable to a battery mounting structure of an electric vehicle in some forms of the present disclosure, and FIG. 4 is a cross-sectional view illustrating a connection of a battery connection member and a side case portion that may be applied to the battery mounting structure of an electric vehicle in some forms of the present disclosure.

Referring to FIG. 3 and referring to FIG. 4, the battery connection member 60 may include a connection hole 66 for connection with the vehicle body 10. The connection hole 66 may be formed in plural along the length direction of the battery connection member 60, and may be easily combined with the vehicle body 10 through the connection hole 66.

The battery mounting structure of the electric vehicle in some forms of the present disclosure may further include a connection pipe 68 inserted into the connection hole 66. The connection with the vehicle body 10 may be made more robust by the connection pipe 68.

Figure 5:
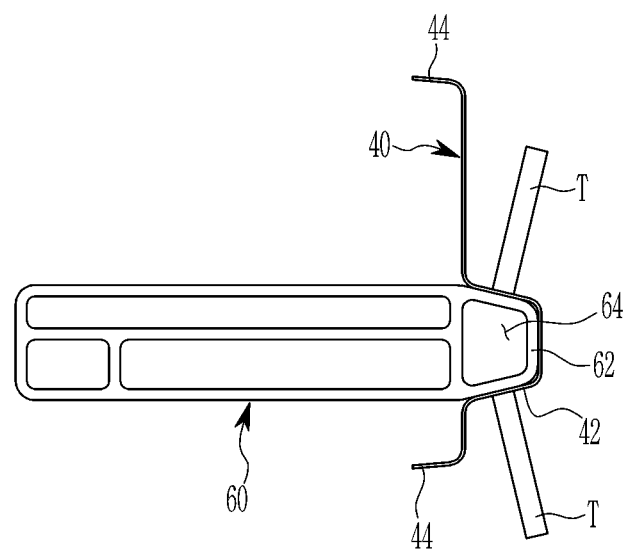
FIG. 5 is a cross-sectional view showing a battery connection member and an outer panel of a side case that may be applied to the battery mounting structure of an electric vehicle in some forms of the present disclosure.

FIG. 5 is a cross-sectional view showing a battery connection member and an outer panel of a side case that may be applied to the battery mounting structure of an electric vehicle in some forms of the present disclosure.

Referring to FIG. 4 and FIG. 5, the recess portion 42 and the insert portion 62 are bolted B together. The recess portion 42 and the insert portion 62 are formed of different materials and may be firmly connected through bolting. Alternatively, the recess portion 42 and the insert portion 62 may be welded together.

The side case portion 30 may include an outer panel 40 having the recess portion 42 formed thereon and an inner panel 50 that is coupled to the outer panel 40.

In the outer panel 40, an outer flange 44 may be formed in a direction opposite to the direction of forming the recess portion 42.

That is, as shown in FIG. 5, the battery connection member 60 is connected to the outer panel 40, and when the battery connection member 60 and the outer panel 40 are combined, a combination tool T, for example, a bolting work or a mechanism for welding work, is applied. In this case, the outer flange 44 is formed in a direction opposite to the recess portion 42, that is, in the left direction of the drawing, so that the possibility of interference with the combination tool T may be prevented.

Figure 6:
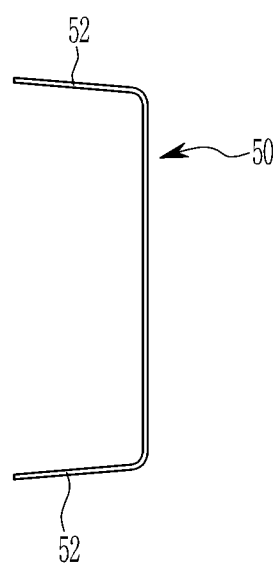
FIG. 6 is a cross-sectional view showing an inner panel that may be applied to the battery mounting structure of an electric vehicle in some forms of the present disclosure.

FIG. 6 is a cross-sectional view showing an inner panel that may be applied to the battery mounting structure of an electric vehicle in some forms of the present disclosure.

Referring to FIG. 6, In the inner panel 50, an inner flange 52 coupled to the outer flange 44 may be formed, and the direction of forming the inner flange 52 may be formed in a direction opposite to the direction of forming the recess portion 42 as the direction of forming the outer flange 44.

Figure 7:
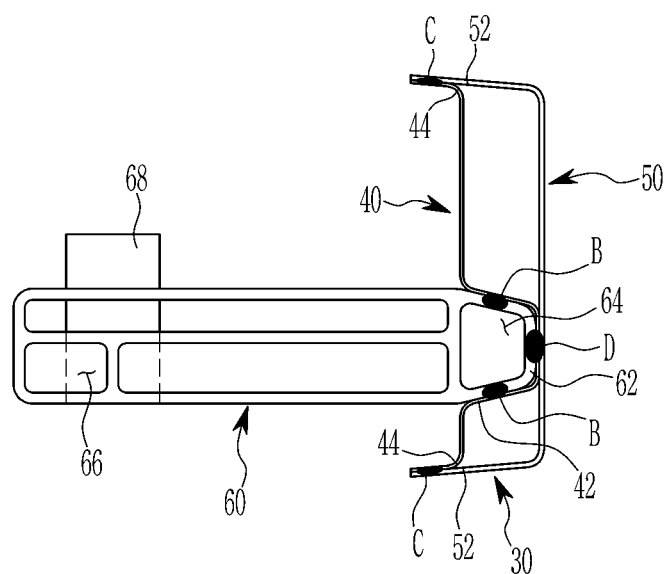
FIG. 7 is a cross-sectional view illustrating a connection of an outer panel and an inner panel that may be applied to the battery mounting structure of an electric vehicle in some forms of the present disclosure.

FIG. 7 is a cross-sectional view illustrating a connection of an outer panel and an inner panel that may be applied to the battery mounting structure of an electric vehicle in some forms of the present disclosure.

The inner flange 52 and the outer flange 44 may be firmly joined by bolting C, or welding, and a space is formed on the inside to reduce weight and secure strength.

The recess portion 42 may contact the inner panel 50, and when an external impact occurs, the impact transmitted from the battery connection member 60 is simultaneously transmitted to the outer panel 40. Thus, the deformation of the outer panel 40 and the inner panel 50 for impact may be minimized.

The recess portion 42 and the inner panel 50 and the insert portion 62 may be bolted D together, and the battery connection member 60, the outer panel 40 and the inner panel 50 may be integrally combined to increase the strength against impact. And the deformation of the outer panel 40 and the inner panel 50 may be minimized.

Figure 8:
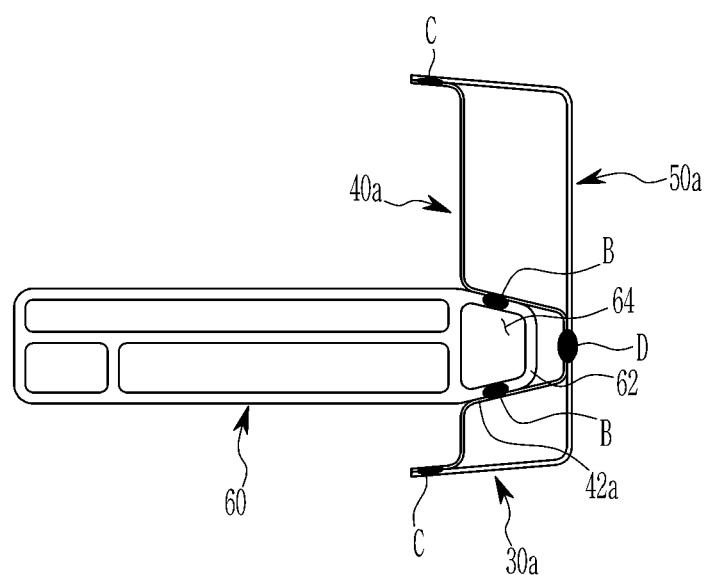
FIG. 8 is a cross-sectional view illustrating a connection between an outer panel and an inner panel that may be applied to the battery mounting structure of an electric vehicle in some forms of the present disclosure.

FIG. 8 is a cross-sectional view illustrating a connection between an outer panel and an inner panel that may be applied to the battery mounting structure of an electric vehicle in some forms of the present disclosure.

In describing the battery mounting structure of the electric vehicle in some forms of the present disclosure shown in FIG. 8, the same reference numerals will be used for the same configuration as the battery mounting structure of the electric vehicle in some forms of the present disclosure of FIG. 1 to FIG. 7.

Referring to FIG. 8, the battery mounting structure of the electric vehicle in some forms of the present disclosure includes a side case portion 30a on which the battery connection member 60 is mounted.

The side case portion 30a may include an outer panel 40a having a recess portion 42a formed thereon and an inner panel 50a that is coupled to the outer panel 40a.

The recess portion 42a contacts the inner panel 50a, and one end of the insert portion 62 of the battery connection member 60 may be separated from the recess portion 42a.

The recess portion 42a and the insert portion 62a may be bolted B together. The recess portion 42a and the insert portion 62a are formed of different materials and may be firmly coupled through bolting. Alternatively, the recess portion 42a and the insert portion 62a may be welded together.

The recess portion 42a and the inner panel 50a may be bolted together D. That is, the outer panel 40a and the inner panel 50a are integrally combined to increase the strength against impact, and the deformation of the outer panel 40a and the inner panel 50a may be minimized.

In addition, when the vehicle collides, the insert portion 62 may be deformed through some empty space between the inside of the recess portion 42a and the insert portion 62, so impact absorption is possible, and thus the deformation of the battery case 20 may be minimized.

According to the battery mounting structure of the electric vehicle in some forms of the present disclosure, under the same weight condition, it was confirmed that the static deformation amount was improved by 42% compared to the existing structure, and the total plastic moment was increased by 96%. The protective effect may be increased.

According to the battery mounting structure of the electric vehicle in some forms of the present disclosure, it is possible to reduce the possibility of a battery fire due to deformation of the battery case, and thus, occupant protection is possible.

According to the battery mounting structure of an electric vehicle in some forms of the present disclosure, weight and cost may be reduced by optimal use of steel and aluminum materials.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A battery mounting structure of an electric vehicle, the battery mounting structure comprising:
 a battery case including a side case portion, the side case portion having a recess portion extending concave inwardly from the side case portion; and
 a battery connection member mounted in a vehicle body and connected to the side case portion, wherein the battery connection member has an insert portion inserted into the recess portion, wherein at least one chamber is formed inside the battery connection member.

2. The battery mounting structure of claim 1, wherein the recess portion and the insert portion are formed at an acute angle with respect to an insert direction of the battery connection member to the side case portion.

3. The battery mounting structure of claim 2, wherein a surface of the recess portion contacts a surface of the insert portion.

4. The battery mounting structure of claim 1, wherein an insert portion chamber is formed inside the insert portion.

5. The battery mounting structure of claim 1, wherein the battery connection member includes a connection hole configured to connect with the vehicle body.

6. The battery mounting structure of claim 5, further comprising:
 a connection pipe inserted into the connection hole.

7. The battery mounting structure of claim 1, wherein the recess portion and the insert portion are bolted together.

8. The battery mounting structure of claim 1, wherein the side case portion comprises:
 an outer panel, wherein the recess portion is formed in the outer panel; and
 an inner panel connected to the outer panel.

9. The battery mounting structure of claim 8, wherein:
 in the outer panel, an outer flange is formed on the side case portion in a direction opposite to the recess portion; and
 an inner flange coupled to the outer flange is formed in the inner panel.

10. The battery mounting structure of claim 8, wherein the recess portion is in contact with the inner panel.

11. The battery mounting structure of claim 10, wherein the recess portion, the inner panel, and the insert portion are bolted together.

12. The battery mounting structure of claim 8, wherein:
the recess portion is in contact with the inner panel; and
the insert portion is separated from the recess portion.

13. The battery mounting structure of claim 12, wherein the recess portion and the inner panel are bolted together.

14. The battery mounting structure of claim 1, wherein the side case portion is formed of a different material from the battery connection member.

15. The battery mounting structure of claim 14, wherein:
the side case portion is formed of steel material; and
the battery connection member is formed of aluminum material.

\* \* \* \* \*